United States Patent [19]

Daniels

[11] Patent Number: 5,022,351
[45] Date of Patent: Jun. 11, 1991

[54] CONVERTIBLE TETHERING SYSTEM

[76] Inventor: Thomas E. Daniels, 1630 Babcock, Suite 130, San Antonio, Tex. 78229

[21] Appl. No.: 512,819

[22] Filed: Apr. 23, 1990

[51] Int. Cl.$^5$ ............................................... A01K 3/00
[52] U.S. Cl. ..................................... 119/124; 119/109
[58] Field of Search ............... 119/109, 116, 117, 121, 119/122, 124

[56] References Cited

U.S. PATENT DOCUMENTS

| | | | |
|---|---|---|---|
| 2,437,786 | 3/1948 | Oberdorf et al. | 119/124 |
| 2,725,853 | 12/1955 | Nordheim | 119/124 |
| 3,123,052 | 3/1964 | Marshall | 119/109 |
| 4,762,089 | 8/1988 | McNulty | 119/109 |
| 4,796,566 | 1/1989 | Daniels | 119/117 X |

FOREIGN PATENT DOCUMENTS 2745563  4/1979  Fed. Rep. of Germany ...... 119/124

Primary Examiner—Gene Mancene
Assistant Examiner—R. Thomas Price
Attorney, Agent, or Firm—Gunn, Lee & Miller

[57] ABSTRACT

The present invention teaches a portable convertible tethering system which is centered around a retractable leash cartridge. The leash cartridge may be used along to restrain children or animals while moving about, or alternatively, the cartridge may be placed in the system's housing which is attached to an anchoring device thereby becoming an integral part of a stationary tethering device. The housing is sized and shaped specifically for securely holding a portable retractable leash cartridge inside, yet is designed for simple insertion and removal of the cartridge. The housing has a lockable door for holding the leash cartridge cartridge inside against force or agitation. The housing is pivotally mounted on the anchor device so that the end of the cartridge from which the leash cord extends may follow that which is tethered; this capability reduces the likelihood that whatever is tethered, particularly an animal such as a dog, will not likely tangle the leash cord around the base of the system's anchor. The system's two-fold use of the retractable leash cartridge provides a user with the most economical avenue for having effective and convenient devices for both mobile and stationary tethering.

8 Claims, 2 Drawing Sheets

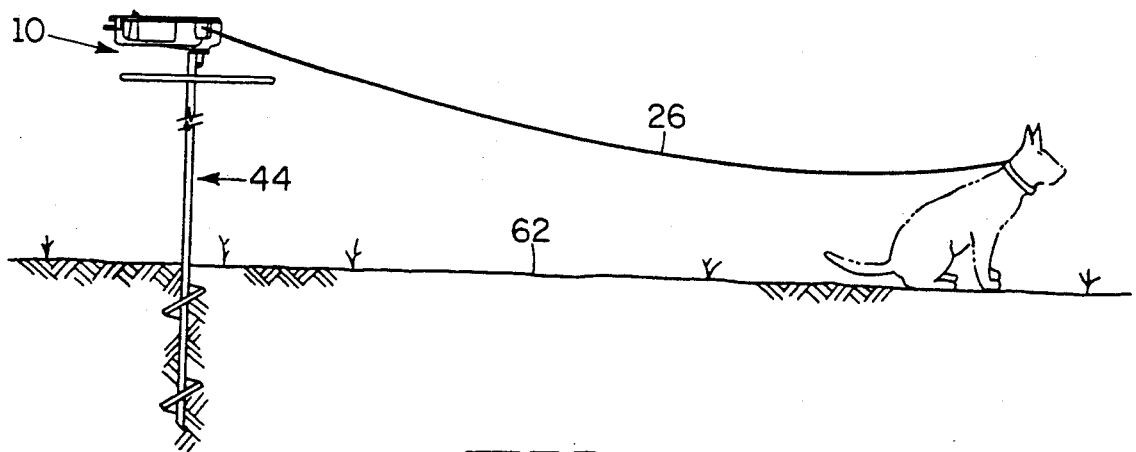
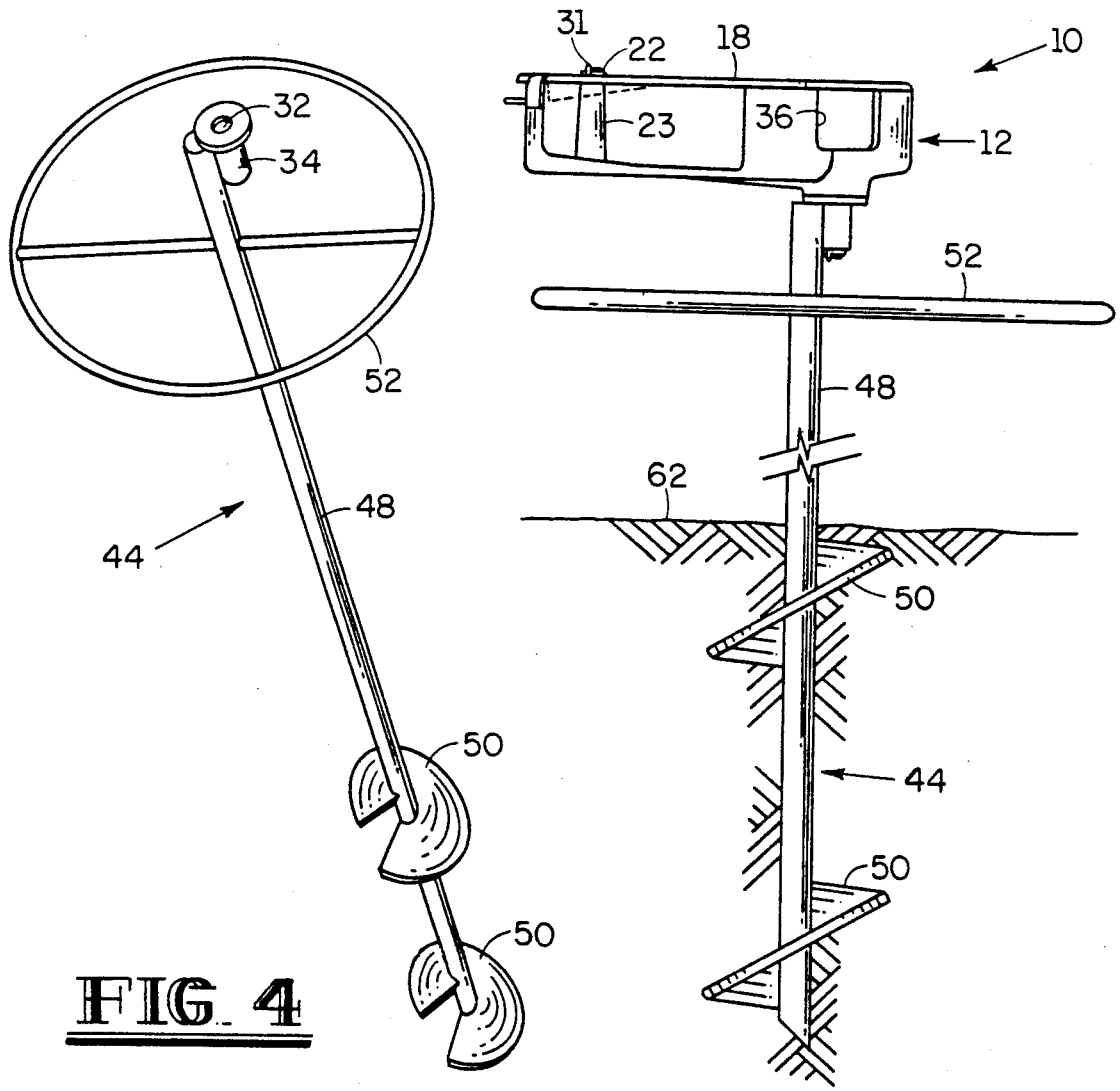

CONVERTIBLE TETHERING SYSTEM

BACKGROUND OF THE INVENTION

1. Field of the Invention

The present invention relates generally to tether and leash devices, and more specifically, to a convertible tethering system comprising a leash cartridge, holding the leash cartridge in a fixed location and thereby becoming a stationary tethering device.

2. Related Patent

Applicant is the owner of U.S. Pat. No. 4,796,566 issued on Jan. 10, 1989. Applicant's present invention is an improvement over the invention disclosed therein.

SUMMARY OF THE INVENTION

The present invention provides convertible tethering system comprising a portable leash cartridge and an apparatus for securing the cartridge at a fixed location. The securing apparatus comprises a housing of a size and shape for securely holding the leash cartridge. The housing has a cartridge opening through which the cartridge is inserted and removed and a door which is attached to the housing for securing the cartridge therein. A door locking mechanism for use when the cartridge is inside the housing is also provided so that a tethered animal may not dislodge the cartridge by excessive movement or force. One embodiment of the invention includes an auger for stably anchoring the apparatus in the ground. Other embodiments include substitutes for the augur such as clamps for clamping to above-ground objects, and suction cups for mounting to smooth surfaces the anchoring member so that the leash "follows" that which is tethered, thus resisting entanglement caused by movement of that which is tethered. The housing is oriented whereby the leash cartridge is held horizontally and is positioned relative to the anchor member whereby the opening for the leash cord is in close proximity to the point of attachment therebetween.

The invention, therefore, provides a novel and useful convertible tethering system, a portion of which (the leash cartridge), serves the dual purposes of restraining children or animals while moving about and serving as the retractable tether cord portion of the stationary tether configuration.

DESCRIPTION OF THE PREFERRED EMBODIMENT

Figure 2:
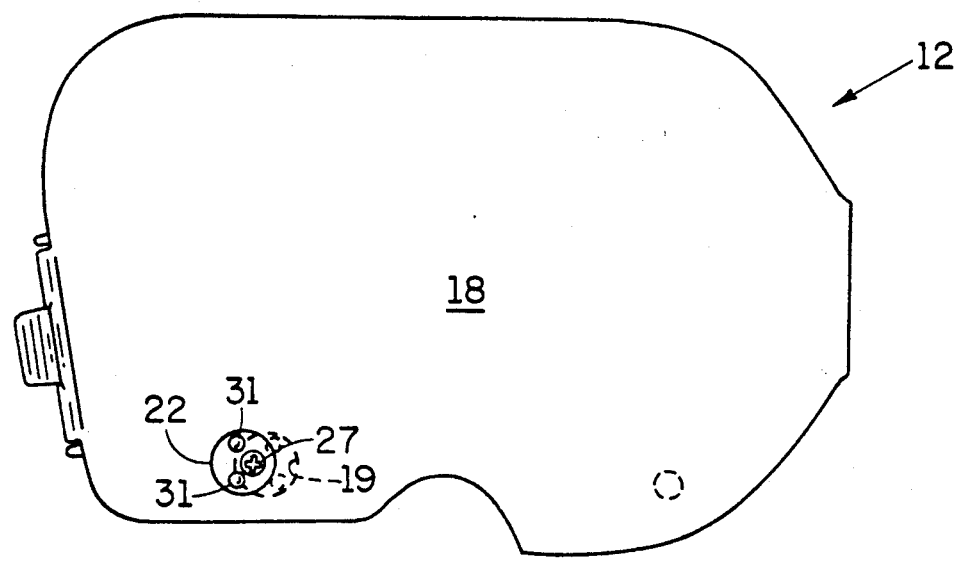
Figure 3:
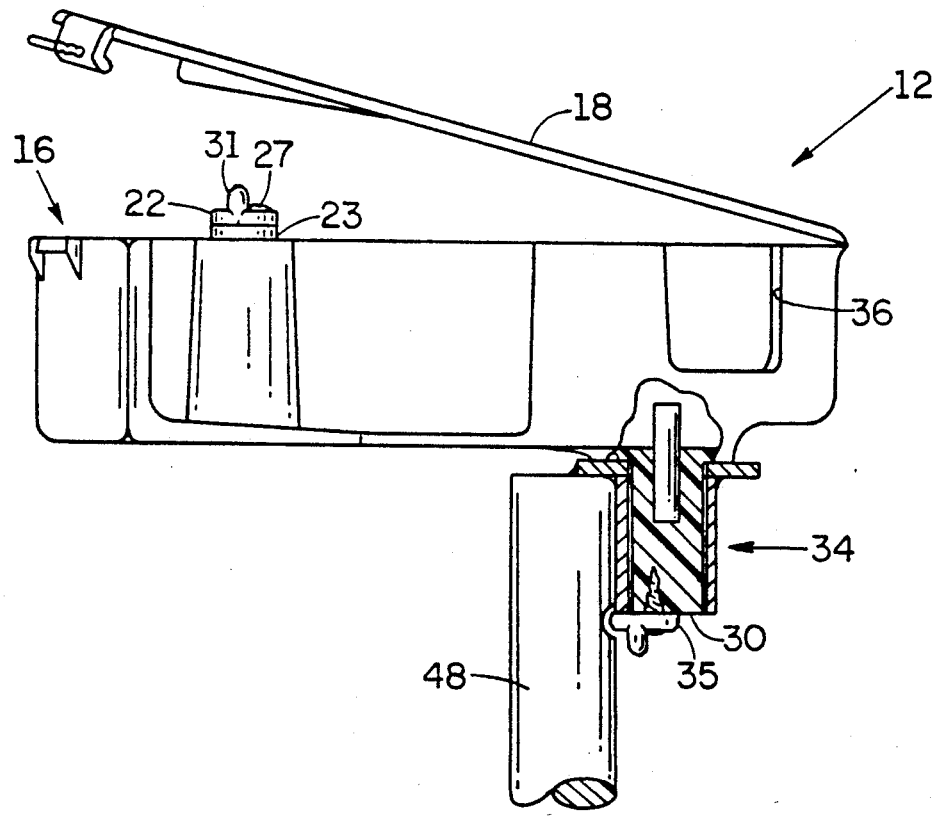

Referring in combination to FIGS. 1 through 3, the convertible tethering system is referred to generally by the reference numeral 10. A housing 12 is manufactured to have a size and shape which corresponds to the shape of a retractable leash cartridge (not shown). One such cartridge is sold by U.K Flexi Company under the Trademark "FLEXI 3". The leash cartridge has a leash extending from it, and a mechanism on the interior of the cartridge (not shown) which causes the leash to be retracted within the cartridge when the appropriate control button is pushed.

The housing 12 of the preferred embodiment is made from high density plastic in an injection molding process. The housing 12 has a cartridge opening 16 which is provided by leaving one of the two broad sides of the housing 12 open. To secure the cartridge within the housing 12, a door 18 is pivotally attached to the housing 12 as shown. The door 18 is of a size and shape for at least partially obstructing the cartridge opening 16.

The housing 12 has a cord opening 25 through which the leash cord 26 from the leash cartridge passes when in use. A control opening 36 is formed in a portion of the side area of the housing 12. The control opening 36 is for providing access to the control buttons of the leash cartridge through the housing 12. The access to the control buttons provided by the control opening 36 makes adjustment of the tether length and actuation of the retracting mechanism possible while the leash cartridge is secured within the housing 12.

Referring particularly to FIGS. 2 and 3, a locking mechanism is provided for securing the door 18 in a closed position. The locking mechanism consists essentially of a disk member 22 having a diameter substantially equivalent to a post 23 which extends from the opposite wall 29 of the housing 12. The disk 22 is rotatably affixed to the post 23 by way of a screw 27 positioned off-center relative to the disk 22 and the post 23. In this manner, the disk 22 may be moved from a first position whereby it is directly superposed over the post's 23 end to other positions whereby it is eccentrically positioned relative to the post 23. The door 18 includes an appropriately positioned hole 19 for receiving the disk 22/post 23 combination therethrough. When the door 18 is to be opened or closed, a user moves the disk 22 to the above-referenced first position whereby the door can freely move to and from the closed position. When the door is to be locked, a user rotates the disk 22 whereby a portion of the disk 22 comes to overlie a portion of the exterior surface of the door 18 thereby retaining the door 18 in place. For ease of use, the disk 23 has projections 31 for easy manipulation.

Referring in combination to FIGS. 2 and 4, the preferred embodiment of the present invention teaches a stud 30 (an extension of the housing 12) which passes through a hole 32 in the housing support block 34 of the anchor member 44. The distal end of the stud 30 is fitted with a disk member 35 in like manner to disk 22 of the locking mechanism for the door 18. Securing the housing 12 to and removing the housing 12 from the anchor member 44 is accomplished in like manner to locking and unlocking the door 18 as above described.

As is apparent from the drawings, the stud 30 and the hole 2 are complimentarily sized and shaped to permit the housing to rotate relative to the housing support block 34. The rotation allows the portion of the leash cartridge from which the leash cord 26 extends to "follow" that which is tethered with the device, thus lessening the possibility that the leash cord 26 will tangle around the apparatus 10. Such entanglement is a well known problem to any person who has tethered an animal for any length of time.

The position of the stud 30 on the housing 12, particularly relative to the leash cord opening 36 is of particular significance. It is noted that the stud 30 extends from a position of close proximity to the leash cord opening 36 and in an orientation whereby the leash cartridge lies in a horizontal orientation when the anchor member 44 is vertically oriented (as typically would be expected). This arrangement minimizes the moment of torque which will be applied to the stud 30 and the casing in general as a tethered animal, for example, pulls against the apparatus. Unlike applicant's previous invention of U.S. Pat. No. 4,796,566, force from the tethered animal is transferred to the stud 30 over a very short distance via a very small portion of the material which forms the housing 12. The present invention has shown through extensive testing to resisting binding and, therefore, damage to the apparatus far better than the embodiment of U.S. Pat. No. 4,796,566.

Referring to FIGS. 4 and 5, the housing support block 34 of the preferred embodiment is simply welded to the anchor member 44. The anchor member 44 of applicant's preferred embodiment is based on a common auger of the type such as is often used to anchor mobile homes to the ground. The anchor member 44 has a shaft 48 and one or more helical ribs 50 which thread into the ground 62. The anchor member 44 provides sufficient stability for the convertible tethering system 10 to resist the forces applied by even the largest household animals. This stability also makes the tether useful for horses and other large animals, as well as for inanimate objects such as boats.

Referring again to FIGS. 4 and 5, to aid in turning the anchor member 44 against the substantial resistance encountered when driving the anchor member 44 into or removing it from certain types of soil, a circular handle 52 is attached by welding to the shaft 48 of the anchor member 44 as shown.

An alternative embodiment of the present invention (not shown) has, instead of the auger 44, a suction device such as is used by window washers for high rise buildings. The suction device serves to attach the apparatus to smooth surfaces such as that of an automobile.

Yet another alternative embodiment of the present invention (not shown) has, instead of the auger 44 or the suction cup device, a clamp which is welded to the housing support block 34. The clamp is of the type available in most hardware stores such as that sold under the trademark VISEGRIP, and serves to attach the apparatus to objects having protrusions or shapes suitable for the use of such a clamp. As with the previously described embodiments, the housing support block 34 would have a hole comparable to hole 32 of the preferred embodiment into which the stud 30 of the housing 12 is placed for securely attaching the housing 12 to the housing support block 34 which would be welded onto the clamp.

Although the preferred embodiment, as described above, has includes a housing for substantially enclosing the leash cartridge, the apparatus may include a clamping member of some kind (not shown) which merely securely grasps the leash cartridge. So long as this clamping member is pivotally mounted to the anchoring device, and so long as the clamping member holds the leash cartridge securely enough, the same benefits with the preferred embodiment may be expected.

Still other alternative embodiments of the present invention may be apparent to persons skilled in the art, and it is intended that the claims be construed to include such additional embodiments.

I claim:

1. A tethering system for mobile and stationary use comprising:
    a portable leash cartridge having a casing, a leash extending therefrom, and cartridge means for retracting said leash within said cartridge;
    a housing for holding said leash cartridge, said housing having a cartridge opening for receiving and removing said leash cartridge and a leash cord opening for allowing a leash cord to pass from said cartridge through said housing;
    securing means for removably securing said leash cartridge within said housing, said securing means comprising:
        a door member pivotally attached to said housing and being oriented, sized and shaped to at least partially obstruct said cartridge opening when said door member is in a closed position, said door member having a hole passing therethrough;
    a post member extending from a portion of said housing and having an exterior end at its distant most terminus from said portion of said housing, said post member being positioned and sized for extending into said hole in said door member but not extending beyond the outer surface of said door member;
    a disk member having a diameter substantially equivalent to the diameter of said post member, said disk being rotatably attached to said post member at a point off-center from the center of said exterior end of said post member whereby said disk member rotates eccentrically relative to said post member and is completely superimposed over said exterior end of said post member in only a very narrow range of rotation, said disk member at all other positions serving to hold said door member in a closed position when said post member extends into said hole and through said door member and said disk member is rotated to partially overlie a portion of said door member adjacent to said post member; and
    anchoring means for removably anchoring said housing in a fixed location, said housing being pivotally mounted to said anchoring means wherein said cartridge is useful for mobile restraint of an animal on said leash, and when maintained within said housing by said securing means, is useful for tethering an animal on said leash at a fixed location without becoming entangled.

2. The invention of claim 1 wherein said housing is attached to said anchoring means by way of a stud extending from said housing into an anchor block member having a suitably sized and shaped stud hole for telescopically receiving said stud and permitting said stud to rotate within said anchor block member, said stud having a second disk member having a diameter substantially equivalent to the diameter of said stud, said disk being rotatably attached to said stud at a point off-center from the center of said exterior end of said stud whereby said second disk member rotates eccentrically relative to said stud and is completely superimposed over said exterior end of said stud only in a very narrow range of rotation, said second disk member at all other positions serving to hold said door member in a closed position when said stud extends into said stud hole through said anchor block member and said second disk member is rotated to partially overlie a portion of said anchor block member adjacent to said stud.

3. The invention of claim 2 wherein said stud extends from a wall portion of said housing opposite said door member whereby when said housing is attached to said anchoring means and said anchoring means are vertically oriented, said leash cartridge within said housing is held horizontally, said stud being position on said wall portion of said housing opposite said door member in close proximity to said leash cord opening.

4. The invention of claim 3 wherein said housing has a control opening for operation of control buttons of said leash cartridge.

5. The invention of claim 1 wherein said anchoring means is an auger member for securely anchoring said housing to the ground, and said anchoring means further comprises handle means for imparting manual torque to said auger member and is operably connected to said auger member.

6. The invention of claim 2 wherein said anchoring means is an auger member for securely anchoring said housing to the ground, and said anchoring means further comprises handle means for imparting manual torque to said auger member and is operably connected to said auger member.

7. The invention of claim 3 wherein said anchoring means is an auger member for securely anchoring said housing to the ground, and said anchoring means further comprises handle means for imparting manual torque to said auger member and is operable connected to said auger member.

8. A tethering system for mobile and stationary use comprising:
- a portable leash cartridge having a casing, a leash extending therefrom, and cartridge means for retracting said leash within said cartridge;
- a housing for holding said leash cartridge, said housing having a cartridge opening for receiving and removing said leash cartridge and a leash cord opening for allowing a leash cord to pass from said cartridge through said housing and a control opening for operation of control buttons of said leash cartridge;
- securing means for removably securing said leash cartridge within said housing, said securing means comprising: a door member pivotally attached to said housing and being oriented, sized and shaped to at least partially obstruct said cartridge opening when said door member is in a closed position, said door member having a hole passing therethrough;
- a post member extending from a portion of said housing and having an exterior end at its distant most terminus from said portion of said housing said post member being positioned and sized for extending into said hole in said door member but not extending beyond the outer surface of said door member;
- a disk member having a diameter substantially equivalent to the diameter of said post member, said disk being rotatably attached to said post member at a point off-center from the center of said exterior end of said post member whereby said disk member rotates eccentrically relative to said post member and is completely superimposed over said exterior end of said post member in only a very narrow range of rotation, said disk member at all other positions serving to hold said door member in a closed position when said post member extends into said hole and through said door member and said disk member is rotated to partially overlie a portion of said door member adjacent to said post member; and
- anchoring means for removably anchoring said housing in a fixed location, said housing being pivotally mounted to said anchoring means wherein said cartridge is useful for mobile restraint of an animal on said leash, and when maintained within said housing by said securing means, is useful for tethering an animal on said leash at a fixed location and is resistant to said animal becoming entangled;
- said housing being attached to said anchor means by way of a stud extending from said housing into an anchor block member having a suitably sized and shaped stud hole for telescopically receiving said stud and permitting said stud to rotate within said anchor block member, said stud having a second disk member having a diameter substantially equivalent to the diameter of said stud, said disk being rotatably attached to said stud is point off-center from the center of said exterior end of said stud whereby said second disk member rotates eccentrically relative to said stud and is completely superimposed over said exterior end of said stud only in a very narrow range of rotation, said second disk member at all other positions serving to hold said door member is closed position when said stud extends into said stud hole through said anchor block member and second disk member is rotated to partially overlie a portion of said anchor block member adjacent to said stud;
- said stud extending from a wall portion of said housing opposite said door member whereby when said housing is attached to said anchoring means and said anchoring means are vertically oriented, said leash cartridge within said housing is held horizontally, said stud being positioned on said wall portion of said housing opposite said door member in close proximity to said leash cord opening.

* * * * *